United States Patent
Jiang et al.

(10) Patent No.: US 6,859,606 B2
(45) Date of Patent: Feb. 22, 2005

(54) $ER^{3+}$ DOPED BORO-TELLURITE GLASSES FOR 1.5 μM BROADBAND AMPLIFICATION

(75) Inventors: Shibin Jiang, Tucson, AZ (US); Tao Luo, Tucson, AZ (US); Qingyun Chen, Orange, CT (US); Sandrine Hocde, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 118 days.

(21) Appl. No.: 10/306,483

(22) Filed: Nov. 27, 2002

(65) Prior Publication Data

US 2004/0101269 A1 May 27, 2004

(51) Int. Cl.$^7$ ............................................. G02B 6/00
(52) U.S. Cl. ..................................... 385/142; 385/141
(58) Field of Search ............................ 385/142; 501/37

(56) References Cited

U.S. PATENT DOCUMENTS

| | | | | |
|---|---|---|---|---|
| 3,723,600 A | * | 3/1973 | Redman | 423/263 |
| 4,962,995 A | * | 10/1990 | Andrews et al. | 359/342 |
| 5,747,397 A | * | 5/1998 | McPherson et al. | 501/51 |
| 6,128,430 A | * | 10/2000 | Chu et al. | 385/142 |
| 6,356,387 B1 | | 3/2002 | Ohishi et al. | |
| 2003/0231852 A1 | * | 12/2003 | Taylor et al. | 385/142 |

OTHER PUBLICATIONS

Doo Hee Cho et al., "Improvement of Apr. 11, 2002–Apr. 13, 2002 Transition Rate and Thermal Stabilities in Er3+–Doped TeO2–B2O3 (GeO2)–Zn)–K2O Glasses", ETRI Journal, Dec. 2001, vol. 23, No. 4, pp. 151–157.

Shaoxiong Shen et al., "Tungsten–tellurite—a host glass for broadband EDFA", Optics Communications, 205, Apr. 15, 2002, pp. 101–105.

Yasutake Ohishi et al., "Gain Characteristics of tellurite–based erbium–doped fiber amplifiers for 1.5–um broadband amplification", Optics Letters, Feb. 15, 1998, vol. 23, No. 4, pp. 274–276.

A. Mori et al., "Low noise broadband tellurite–based Er3+–doped fibre amplifiers", Electronics Letters, Apr. 30, 1998, vol. 34, No. 9, pp. 887–888.

Yongdan Hu et al., "Numerical analyses of the population dynamics and determination of the upconversion coefficients in a new high erbium–doped tellurite glass", J. Opt. Soc. Am., Dec. 2001, B/vol. 18, No. 12, pp. 1928–1934.

Y.G. Choi et al., "Enhanced Apr. 11, 2002–Apr. 13, 2002 transition rate in Er3+/Ce3+–codoped tellurite glasses", Electronics Letters, Sep. 30, 1999, vol. 35, No. 20, pp. 1765–1767.

Atsushi Mori et al., "1.5um Broadband Amplification by Tellurite–Based EDFAs", PD1–1, pp. 371–374.

A. Mori et al., "Erbium–doped tellurite glass fibre laser and amplifier", Electronic Letters, May 8, 1997, vol. 33, No. 10, pp. 863–864.

* cited by examiner

Primary Examiner—Phan T. H. Palmer
Assistant Examiner—Jennifer Doan
(74) Attorney, Agent, or Firm—Eric A. Gifford

(57) ABSTRACT

A tellurite-based glass composition for use in EDFAs exhibits higher phonon energy without sacrificing optical, thermal or chemical durability properties. The introduction of boron oxide ($B_2O_3$) into the $Er^{3+}$-doped tellurite glasses increases the phonon energy from typically 785 cm$^{-1}$ up to 1335 cm$^{-1}$. The inclusion of additional glass components such as $Al_2O_3$ has been shown to enhance the thermal stability and particularly the chemical durability of the boro-tellurite glasses. Er:Yb codoping of the glass does further enhance its gain characteristics.

29 Claims, 14 Drawing Sheets

| core glass composition | TeO2 | B2O3 | A2O3 | R2O | MO | GeO2 | L2O3 |
|---|---|---|---|---|---|---|---|
| range mol % | 50~70 | 5~22 | 5~18 | 5~25 | 0~15 | 0~7 | 0.25~10 wt% |

| core glass composition | TeO2 | B2O3 | A2O3 | R2O | MO | GeO2 | L2O3 |
|---|---|---|---|---|---|---|---|
| range mol % | 55~65 | 10~20 | 7~15 | 10~20 | 0~10 | 0~5 | 0.25~6 wt% |
| range mol % | 55~65 | 10~20 | 7~15 Al2O3 | 10~20 Na2O | 0~10 | 0~5 | 0.25~6 wt% |
| range mol % | 55~65 | 10~20 | 10~15 Al2O3 | 10~20 Na2O | 0~10 | 0~5 | 0.25~6 wt% |
| range mol % | 55~65 | 10~20 | 10~15 Al2O3 | 10~20 Na2O | 0~10 | 0~5 | 0.25~3 wt% Er2O3 |
| range mol % | 55~65 | 10~20 | 10~15 Al2O3 | 10~20 Na2O | 0~10 | 0~5 | 0.25~5 wt% Er2O3 + Yb2O3 |
| range mol % | 55~65 | 10~20 | 10~15 Al2O3 | 10~20 Na2O | 0~10 | 0~5 | 0.25~3 wt% Er2O3 + 0.25~3 wt% Yb2O3 |
| range mol % | 55~65 | 10~20 | 10~15 Al2O3 | 10~20 Na2O | 0~10 | 0~5 | 0.25~3 wt% Tm2O3 |

| core glass comp. | TeO2 | B2O3 | Al2O3 | Na2O | MO | GeO2 | L2O3 |
|---|---|---|---|---|---|---|---|
| mol% | 60 | 15 | 10 | 15 | 0 | 0 | 0.25~3 wt% Er2O3 |
| mol% | 60 | 15 | 10 | 15 | 0 | 0 | 0.25~5 wt% Er2O3 + Yb2O3 |
| range mol % | 60 | 15 | 10 | 15 | 0 | 0 | 0.25~3 wt% Er2O3 + 0.25~3 wt% Yb2O3 |
| mol% | 60 | 15 | 10 | 15 | 0 | 0 | 0.25~3 wt% Tm2O3 |

ER³⁺ DOPED BORO-TELLURITE GLASSES FOR 1.5 μM BROADBAND AMPLIFICATION

BACKGROUND OF THE INVENTION

1. Field of the Invention

This invention relates to $Er^{3+}$ doped tellurite glasses and more specifically to $Er^{3+}$ doped boro-tellurite glasses with increased phonon energy for 1.5 μm broadband amplification.

2. Description of the Related Art

Optical amplifiers are considered enabling components for bandwidth expansion in fiber optic communications systems. In particular, silica glass erbium doped fiber amplifiers (EDFA) exhibit many desirable attributes including high gain, low noise, negligible crosstalk and intermodulation distortion, bit-rate transparency, and polarization insensitive gain. These properties make optical fiber amplifiers superior to semiconductor devices as amplifiers in fiber optic systems. Moreover, fiber-based amplifiers do not require conversion from electrical energy to photon energy. In a communications system of any significant size, there is typically a distribution network that includes long communication paths and nodes where the network branches. In such a network, amplifiers are required in order to maintain the amplitude of the signal and the integrity of any data in route between a source and destination. To function properly, the amplifiers must exhibit high small signal gains and/or high output saturation powers over a desired bandwidth. One drawback of silica EDFAs is their limited 30 nm bandwidth, which limits the transmission capacity of WDM systems.

Tellurite glasses provide a broad bandwidth of over 70 nm and thus have received considerable attention for use in EDFAs. See A. Mori et al "1.5 μm Broadband Amplification By Tellurite-Based EDFAs," *Technical Digest of Conf. Optical Fibe-Comm.* 1997 (OFC'97), Feb 16–21, 1997 and Y. Ohishi et al. "Gain Characteristics of Tellurite-Based Erbium-Doped Fiber Amplifiers for 1.5 μm Broadband Amplification" *Opt. Lett.*, vol. 23, no. 4, 1998, p. 274.

To amplify a 1.5 μm signal, EDFAs can be optically pumped at 1480 nm or at 980 nm as shown in the energy level diagram 10 of $Er^{3+}$, FIG. 1. Pumping at 1480 nm is typically used for high power EDFAs because the ground state absorption to the $^4I_{13/2}$ energy level has a high absorption cross-section relative to the $^4I_{11/2}$ energy level. Unfortunately, this scheme does not provide full population inversion or good SNR and is not adequate for many EDFA applications.

980 nm optical pumping provides good SNR and low cost but the small signal gain is significantly less than what is achieved with 1480 nm pumping for erbium doped low phonon energy glass fibers, such as fluorite glass fiber and tellurite glass fiber. Tellurite glasses contain heavy elements, which translates into small phonon energy (typically between 680 and 785 cm⁻¹) as compared to silicate glasses which present high phonon energy (typically around 1100 cm⁻¹). Phonon energy has a strong influence on the lifetimes of the different excited states of $Er^{3+}$ because the relaxation between levels is dominated by multiphonon processes. The larger the number of phonons involved, the smaller the probability of relaxation to the lower energy level, and the longer the lifetime of a given excited state, for instance $^4I_{11/2}$ of erbium ions.

With 980 nm pumping the level $^4I_{11/2}$ gets populated first, and then through phonon-assisted relaxation the lower level $^4I_{13/2}$ gets populated. Gain is achieved through transition between the levels $^4I_{13/2}$ and $^4I_{15/2}$. For optimal operation, the lifetime of the level $^4I_{11/2}$ should be as short as possible. Otherwise, excited state absorption processes from the level $^4I_{11/2}$ to higher energy excited states such as $^4F_{7/2}$ will occur and reduce the gain at 1550 nm. Consequently, the low phonon energy of tellurite glass creates longer lifetimes, which in turn reduces small signal gain when pumped with 980 nm laser diode.

Y. G. Choi et al, "Enhanced $^4I_{11/2} \rightarrow {}^4I_{13/2}$ Transition Rate in $Er^{3+}/Ce^{3+}$-Codoped Tellurite Glasses," *Electron. Lett.* Vol. 35, no. 20, 1999, p. 1765 proposed $Ce^{3+}$-codoping to enhance the 980 nm pumping efficiency through the non-radiative energy transfer $Er^{3+}:{}^4I_{11/2}, Ce^{3+}:{}^2F_{5/2} \rightarrow Er^{3+}:{}^4I_{13/2}, Ce^{3+}: {}^2F_{7/2}$. The co-doping provides an additional channel for the relaxation $^4I_{11/2} \rightarrow {}^4I_{13/2}$ in the $Er^{3+}$-doped tellurite glasses which shortens the lifetime of the $^4I_{11/2}$ level and enhances the population accumulation in the $^4I_{13/2}$ level and the 980 nm pumping efficiency.

A more effective approach would be to increase the phonon energy of the tellurite glass without sacrificing the glass' optical, thermal stability or chemical durability properties.

SUMMARY OF THE INVENTION

The present invention provides a tellurite-based glass composition for use in EDFAs that exhibits higher phonon energy without sacrificing optical, thermal stability or chemical durability properties.

This is accomplished by introducing boron oxide ($B_2O_3$), which has a phonon energy up to 1335 cm⁻¹, into the $Er^{3+}$-doped tellurite glasses. The introduction of $B_2O_3$ increases the phonon energy of the host glass and the multiphonon relaxation rate of the $^4I_{11/2} \rightarrow {}^4I_{13/2}$ transition, which enhances the population accumulation in the $^4I_{13/2}$ level and the 980 nm pumping efficiency. The inclusion of additional glass components such as $Al_2O_3$ has been shown to enhance the thermal, stability and particularly the chemical durability of the boro-tellurite glasses. Er:Yb codoping of the glass will further enhance its pump efficiency In one embodiment, the boro-tellurite glass composition for the fiber core includes the following ingredients: a glass network former $TeO_2$ from 50 to 70 mole percent, $B_2O_3$ from 5 to 22 mole percent, $A_2O_3$ from 5 to 18 mole percent, a glass network modifier $R_2O$ from 5 to 25 mole percent, a glass network modifier MO from 0 to 15 mole percent, $GeO_2$ from 0 to 7 mole percent and rare-earth dopant $L_2O_3$ from 0.25 to 10 weight percent wherein $R_2O$ is selected from oxides $Li_2O$, $Na_2O$, $K_2O$ and mixtures thereof, MO is selected from oxides MgO, CaO, BaO, ZnO and mixtures thereof, $A_2O_3$ is selected from $Al_2O_3$, $Y_2O_3$ and mixtures thereof, and rare-earth dopant $L_2O_3$ is selected from rare earth oxides $Er_2O_3$, $Yb_2O_3$, $Tm_2O_3$, $Tb_2O_3$, $CeO_2$, $Sm_2O_3$ and $Nd_2O_3$ and mixtures thereof. The cladding glass has a similar composition absent the rare-earth dopants.

In another embodiment, the boro-tellurite glass composition for the fiber core includes the following ingredients: a glass network former $TeO_2$ from 55 to 65 mole percent, $B_2O_3$ from 10 to 20 mole percent, $A_2O_3$ from 7 to 15 mole percent, a glass network modifier $R_2O$ from 10 to 20 mole percent, a glass network modifier MO from 0 to 10 mole percent, $GeO_2$ from 0 to 5 mole percent and rare-earth dopant $L_2O_3$ from 0.25 to 6 weight percent. In one embodiment, the glass comprises $Al_2O_3$ ($A_2O_3$) from 7 to 15 mole percent and $Na_2O$ ($R_2O$) from 10–20 percent. In another embodiment, the glass comprises $Al_2O_3$ from 10 to 15 mole percent. The glass may be doped with, for example, 0.25 to 3 wt. % percent $Er_2O_3$, 0.25 to 5 wt. % of an $Er_2O_3$ and $Yb_2O_3$ mixture, 0.25 to 5 wt. % each of $Er_2O_3$ and $Yb_2O_3$, or approximately 0.25 to 3 wt. % of $Tm_2O_3$.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2 through 4 provide boro-tellurite glass compositions in accordance with the present invention;

DETAILED DESCRIPTION OF THE INVENTION

Figure 1:
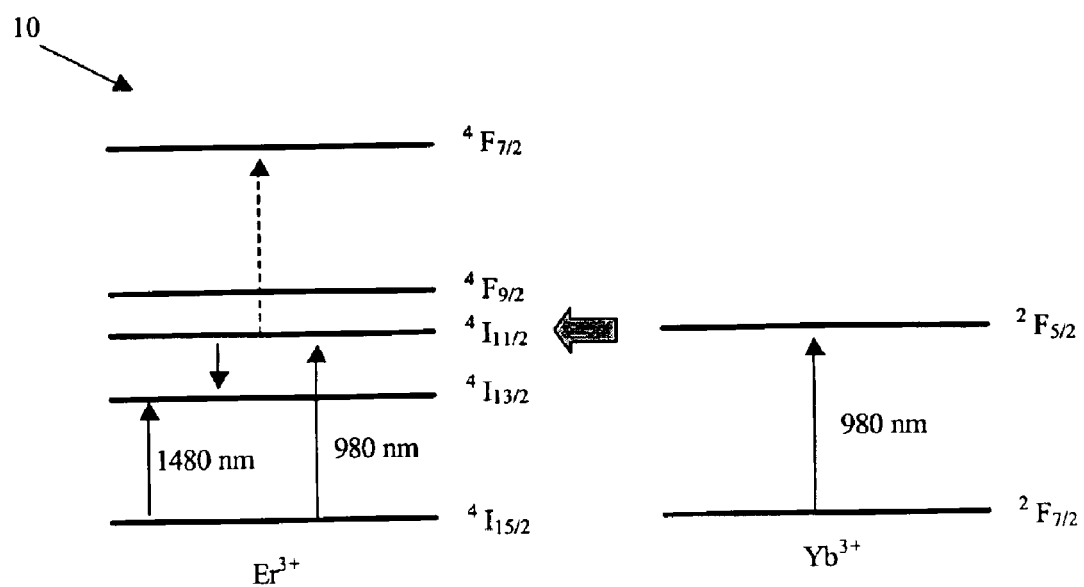
FIG. 1, as described above, is the energy level diagram of $Er^{3+}$ in tellurite glass.

The present invention provides a tellurite-based glass composition for use in EDFAs that exhibits higher phonon energy without sacrificing optical, thermal stability or chemical durability properties. Boron oxide ($B_2O_3$), which has a phonon energy up to 1335 $cm^{-1}$, is introduced into the $Er^{3+}$-doped tellurite glasses. The introduction of $B_2O_3$ increases the phonon energy of the host glass and the multiphonon relaxation rate of the $^4I_{11/2} \rightarrow ^4I_{13/2}$ transition, which enhances the population accumulation in the $^4I_{13/2}$ level and the 980 nm pumping efficiency. The inclusion of additional glass components such as $Al_2O_3$ has been shown to enhance the thermal stability and particularly the chemical durability of the boro-tellurite glasses.

In glass compositions, the glass network former, modifier and other elements are typically specified in mole % because the glass structure is related with the mole % of every element in the glass. The dopants are typically specified in weight % because the doping concentration in term of ions per volume, e.g., ions per cubic centimeters, can be readily derived and is critical information for photonic and optical related applications.

Boro-Tellurite Glass Composition

As shown in FIG. 2, the boro-tellurite glass composition 20 for the fiber core includes a glass network former $TeO_2$ from 50 to 70 mole percent. $TeO_2$ concentrations in excess of 70 mole percent produce glasses with a strong tendency to crystallize. $B_2O_3$ from 5 to 22 mole percent is introduced into the tellurite glass to raise the phonon energy of the lattice. Concentrations in excess of 22 mole percent tend to cause phase separation in the glass. The glass includes $A_2O_3$ ($Al_2O_3$, $Y_2O_3$ and mixtures thereof) from 5 to 18 mole percent, to increase the glass transition temperature and improve thermal stability and particularly chemical durability. When the content of $A_2O_3$ exceeds 18 mole percent, the melting temperature of glass becomes too high and decomposition and crystallization could occur. The glass composition further includes network modifiers $R_2O$ (oxides $Li_2O$, $Na_2O$, $K_2O$ and mixtures thereof) from 5 to 25 mole percent and MO (oxides MgO, CaO, BaO, ZnO and mixtures thereof) from 0 to 15 mole percent. The network modifiers are needed to obtain a stable tellurite glass but tend to deteriorate its chemical durability and lead to crystallization appearance when present at elevated concentrations. $GeO_2$ from 0 to 7 mole percent may be added to increase the glass transition temperature and refractive index and improve thermal stability but $GeO_2$ is an expensive material. Finally, the core glass is doped with a rare-earth dopant $L_2O_3$ from 0.25 to 10 weight percent selected from rare earth oxides $Er_2O_3$, $Yb_2O_3$, $Tm_2O_3$, $Tb_2O_3$, $CeO_2$, $Sm_2O_3$ and $Nd_2O_3$ and mixtures thereof. The cladding glass has a similar composition absent the rare-earth dopants. The introduction of $Al_2O_3$ into the glass has been found to be particularly effective at improving chemical durability.

As shown in FIG. 3, a boro-tellurite glass composition 30 for the fiber core includes the following ingredients: a glass network former $TeO_2$ from 55 to 65 mole percent, $B_2O_3$ from 10 to 20 mole percent, $A_2O_3$ from 7 to 15 mole percent, a glass network modifier $R_2O$ from 10 to 20 mole percent, a glass network modifier MO from 0 to 10 mole percent, $GeO_2$ from 0 to 5 mole percent and rare-earth dopant $L_2O_3$ from 0.25 to 6 weight percent. In one embodiment, the glass comprises $Al_2O_3$ ($A_2O_3$) from 7 to 15 mole percent and $Na_2O$ ($R_2O$) from 10–20 mole percent. In another embodiment, the glass comprises $Al_2O_3$ from 10 to 15 mole percent. The glass may be doped with, for example, 0.25 to 3 wt. % percent $Er_2O_3$, 0.25 to 5 wt. % of an $Er_2O_3$ and $Yb_2O_3$ mixture, 0.25 to 5 wt. % each of $Er_2O_3$ and $Yb2O_3$, or approximately 0.25 to 3 wt. % of $Tm_2O_3$.

As shown in FIG. 4, a boro-tellurite glass composition 40 for the fiber core includes the following ingredients: a glass network former of approximately 60 mole percent $TeO_2$, approximately 15 mole percent $B_2O_3$, approximately 10 mole percent $Al_2O_3$, and approximately 15 mole percent $Na_2O$. The glass may be doped with, for example, 0.25 to 3 wt. % percent $Er_2O_3$, 0.25 to 5 wt. % of an $Er_2O_3$ and $Yb_2O_3$ mixture, 0.25 to 5 wt. % each of $Er_2O_3$ and $Yb_2O_3$, or approximately 0.25 to 3 wt. % of $Tm_2O_3$.

As previously described, in typical tellurite glass the low phonon energy causes the lifetime of the $^4I_{11/2}$ level of erbium ions to be relatively long, which in turn reduces small signal gain. In addition, the long lifetime lowers the transfer efficiency from Yb ions to Er ions so co-doping is not beneficial, hence not used in known tellurite glasses.

The introduction of boron oxide into the tellurite glass increases the phonon energy, which, as described above, has a direct impact on small signal gain. In addition, the higher phonon energy reduces the lifetime of the $^4I_{11/2}$ level. This shortening of the lifetime reduces back energy transfer from Er to Yb ions and makes the Er:Yb codoping beneficial. Thus in certain cases the glass is co-doped with Er:Yb to increase the pump efficiency of the glass, fiber and EDFA.

Co-doping with ytterbium enhances population inversion of the erbium $^4I_{13/2}$ metastable state. The $Yb^{3+}$ excited states $^2F_{5/2}$ are pumped from the $Yb^{3+}$ $^2F_{7/2}$ ground state with the same pump wavelength that is used to excite upward transitions from the erbium ground state $^4I_{15/2}$. Energy levels of the excited ytterbium $^2F_{5/2}$ state coincide with energy levels of the erbium $^4I_{11/2}$ state permitting energy transfer (i.e. electron transfer) from the pumped ytterbium $^2F_{5/2}$ state to the erbium $^4I_{11/2}$ state. Thus, pumping ytterbium ionic energy states provides a mechanism for populating the metastable erbium $^4I_{13/2}$ state, permitting even higher levels of population inversion and more stimulated emission than with erbium doping alone.

Ytterbium ions exhibit not only a large absorption cross-section but also a broad absorption band between 900 and 1100 nm. Furthermore, the large spectral overlap between $Yb^{3+}$ emission ($^2F_{7/2}$-$^2F_{5/2}$) and $Er^{3+}$ absorption ($^4I_{15/2}$-$^4I_{11/2}$) results in an efficient resonant energy transfer from the $Yb^{3+}$ to the $Er^{3+}$, exciting the $^4I_{11/2}$ level. The energy transfer mechanism in an $Yb^{3+}/Er^{3+}$ co-doped system is similar to that for cooperative upconversion processes in an $Er^{3+}$ doped system. However, interactions are between $Yb^{3+}$ (donor) and $Er^{3+}$ (acceptor) ions instead of between two excited $Er^{3+}$ ions. Thus, in one embodiment the present invention utilizes Er:Yb co-doped boro-tellurite glass doped with 0.25 to 5 weight percent of an $Er_2O_3$ and $Yb_2O_3$ mixture. Typically, this glass is doped with 0.25–3 weight percent of $Er_2O_3$ and 0.25–3 weight percent of $Yb_2O_3$.

Figure 5:
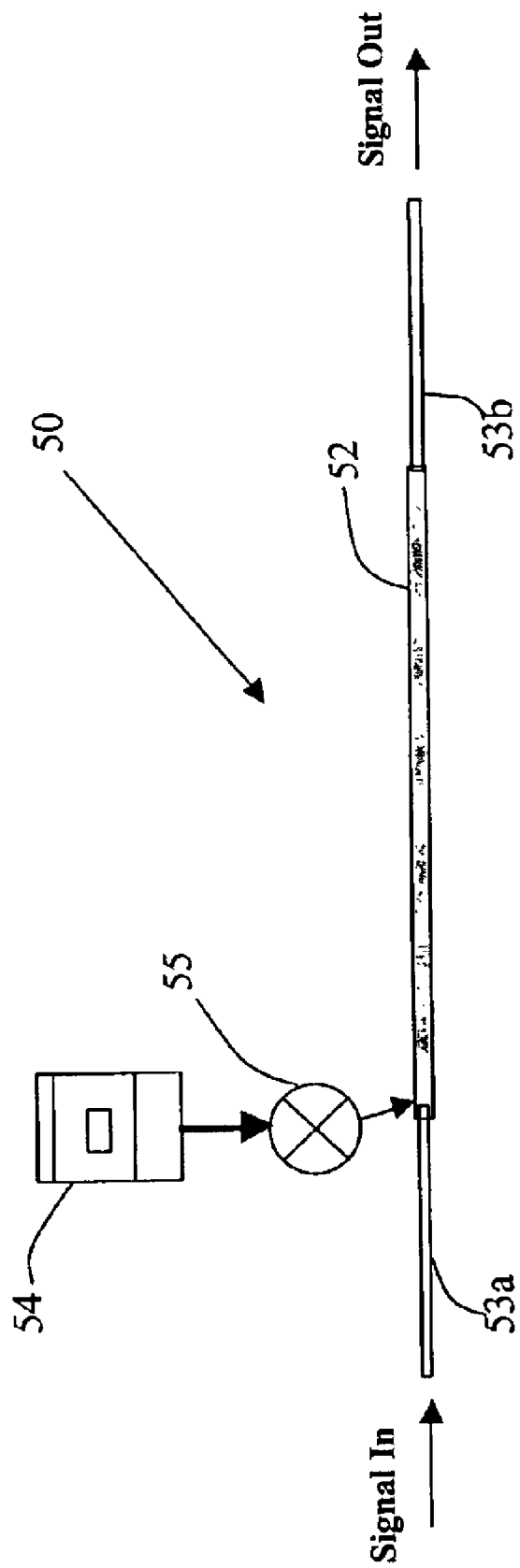
FIG. 5 is a diagram of a boro-tellurite based EDFA.

As shown in FIG. 5, a boro-tellurite EDFA 50 includes a boro-tellurite active fiber 52 of the type just described and a 980 nm optical pump 54. The active fiber is coupled between a pair of input and output fibers, 53a and 53b, typically passive double-clad silica fiber. Coupling of the signal between fibers can be achieved using free-space optics or by fusion splicing. Optical pump 54 can be either a single-mode or a multi-mode pump and is coupled into the active fiber using a pump coupler 55 such as a WDM, a side-coupler such as Goldberg's V-groove as described in U.S. Pat. No. 5,854,865 or by using a total internal reflection (TIR) coupler as described in co-pending U.S. patent application Ser. No. 09/943,257 entitled "Total Internal Reflection (TIR) Coupler and Method for Side-Coupling Pump Light into a Fiber", which is hereby incorporated by reference. The optical pump excites the ionic rare-earth dopants in the core of the fiber to produce stimulated emission and amplification of an input signal propagating through the fiber. Using the boro-tellurite fiber of the present invention, the EDFA provides a moderate amount of gain over a wide bandwidth.

Experimental Procedure

The development of the boro-tellurite glasses provided in FIGS. 2, 3 and 4 are the result of considerable experimentation and analysis to determine appropriate compositions that not only increase phonon energy but do so without reducing the bandwidth or deteriorating the optical, thermal or chemical durability properties of the glass.

The different glass compositions were prepared according to the following procedure: high-purity oxides (99.999% and 99.99% pure) were weighed according to desired oxide molar percentages and mixed. Each mixture of powders was heated in a furnace at temperatures ranging from 700° C. to 800° C. depending on the melting properties of each composition. The melted bath (or glass, or mixture) was then kept under a flow at 10 LPM (liter per minute) of nitrogen gas. This treatment removes hydroxyl impurities (OH⁻) from the glass, which are known to reduce the light-emitting properties of the Er ions. After this treatment, the melts were cast into moulds preheated at the glass transition temperature of each composition and the solids were annealed at this temperature for two hours before being cooled down slowly to room temperature over a period of 15 hours.

The determination of the glass transition temperature for each composition was carried out by differential scanning calorimetry. For these experiments, glasses were first reduced to powder and placed into alumina crucibles and heated at a rate of 10° C./min from room temperature to 800° C. under a flow of nitrogen gas at 0.1 LPM. Other temperatures, including the onset crystallization temperature Tx, the crystallization peak temperature Tc, and the melting point temperature Tm were determined following the same procedure.

To test the chemical durability of each glass composition, samples with dimensions of approximately 4×16×24 mm were cut, polished, and weighed carefully. Then the samples were immersed in boiling water for fixed time periods and carefully weighed again between successive immersions. An important weight loss (measured in units of mg/mm$^2$) following immersion in boiling water is indicative of poor chemical durability and vice versa.

Other characterization experiments included density measurements in which the volume of each sample was determined by immersing the samples in carbon tetrachloride, optical spectroscopy in the UV, visible and near infra-red, and refractive index measurements using a multiwavelength prism coupler. For the determination of phonon energies infrared spectroscopy was performed. For these experiments, 1 mg of glass powder was mixed with 150 mg of dried KBr and the mixture was formed into a flat pellet by compression. During the experiments, the spectrophotometer was purged by dried air.

For the measurement of the rare-earth emission spectrum and fluorescence lifetime, 300 $\mu$m-thick samples with polished facets were prepared. Emission spectra were recorded with a spectrometer while the samples were pumped at 980 nm using a cw Ti:sapphire laser. Absolute values of the absorption and emission cross sections were calculated using McCumber theory. The fluorescence lifetime of $Er^{3+}$ was determined from the measured fluorescence decay curve of the $^4I_{13/2} \rightarrow ^4I_{15/2}$ transition.

Experimental Results

Table 1 provides a list of glasses with their respective composition that were fabricated and tested. In this example, the $Er_2O_3$ concentration was fixed at one weight percent of the total weight of the glass. For comparison, a glass containing tungsten oxide was also prepared.

When the $Na_2O$ concentration is decreased in the boro-tellurite glasses, especially when $Na_2O$ is replaced by $Al_2O_3$, their color changes from yellow to pink. Since the glasses contain erbium ions, and since these ions are known to confer a pink color to a transparent glass matrix, it can be deduced that the decrease of $Na_2O$, especially when it is replaced by $Al_2O_3$, shifts the UV absorption edge towards the shorter wavelength.

TABLE 1

Glass names and compositions.

| Glass | Composition (% mol) |
|---|---|
| 25Na | 25 $Na_2O$—15 $B_2O_3$—60 $TeO_2$—$1_{WT}$ $Er_2O_3$ |
| 5Te | 20 $Na_2O$—15 $B_2O_3$—65 $TeO_2$—$1_{WT}$ $Er_2O_3$ |
| 5Ge | 20 $Na_2O$—5 $GeO_2$—15 $B_2O_3$—60 $TeO_2$—$1_{WT}$ $Er_2O_3$ |
| 7Ge | 18 $Na_2O$—7 $GeO_2$—15 $B_2O_3$—60 $TeO_2$—$1_{WT}$ $Er_2O_3$ |
| 5Ge2Te | 18 $Na_2O$—5 $GeO_2$—15 $B_2O_3$—62 $TeO_2$—$1_{WT}$ $Er_2O_3$ |
| 5Al | 20 $Na_2O$—5 $Al_2O_3$—15 $B_2O_3$—60 $TeO_2$—$1_{WT}$ $Er_2O_3$ |
| 7Al | 18 $Na_2O$—7 $Al_2O_3$ 15 $B_2O_3$—60 $TeO_2$—$1_{WT}$ $Er_2O_3$ |
| 10Al | 15 $Na_2O$—10 $Al_2O_3$—15 $B_2O_3$—60 $TeO_2$—$1_{WT}$ $Er_2O_3$ |
| 5Al2Te | 18 $Na_2O$—5 $Al_2O_3$—15 $B_2O_3$—62 $TeO_2$—$1_{WT}$ $Er_2O_3$ |
| 5Al 5Ge | 15 $Na_2O$—5 $Al_2O_3$—5 $GeO_2$—15 $B_2O_3$—60 $TeO_2$—$1_{WT}$ $Er_2O_3$ |

TABLE 1-continued

Glass names and compositions.

| Glass | Composition (% mol) |
|---|---|
| 10Al 5Ge | 10 Na$_2$O—10 Al$_2$O$_3$—5 GeO$_2$—15 B$_2$O$_3$—60 TeO$_2$—1$_{WT}$ Er$_2$O$_3$ |
| 15K25W | 15 K$_2$O—25 WO$_3$—60 TeO$_2$—1$_{WT}$ Er$_2$O$_3$ |

Thermal Properties

An important characteristic that defines a good glass is its resistance to crystallization. Crystallization can occur when the glass is heated above its glass transition temperature and leads to an exothermic peak in a differential scanning calorimetry (DSC) curve. Such DSC curves are shown in FIGS. 6 and 7.

Figure 6:
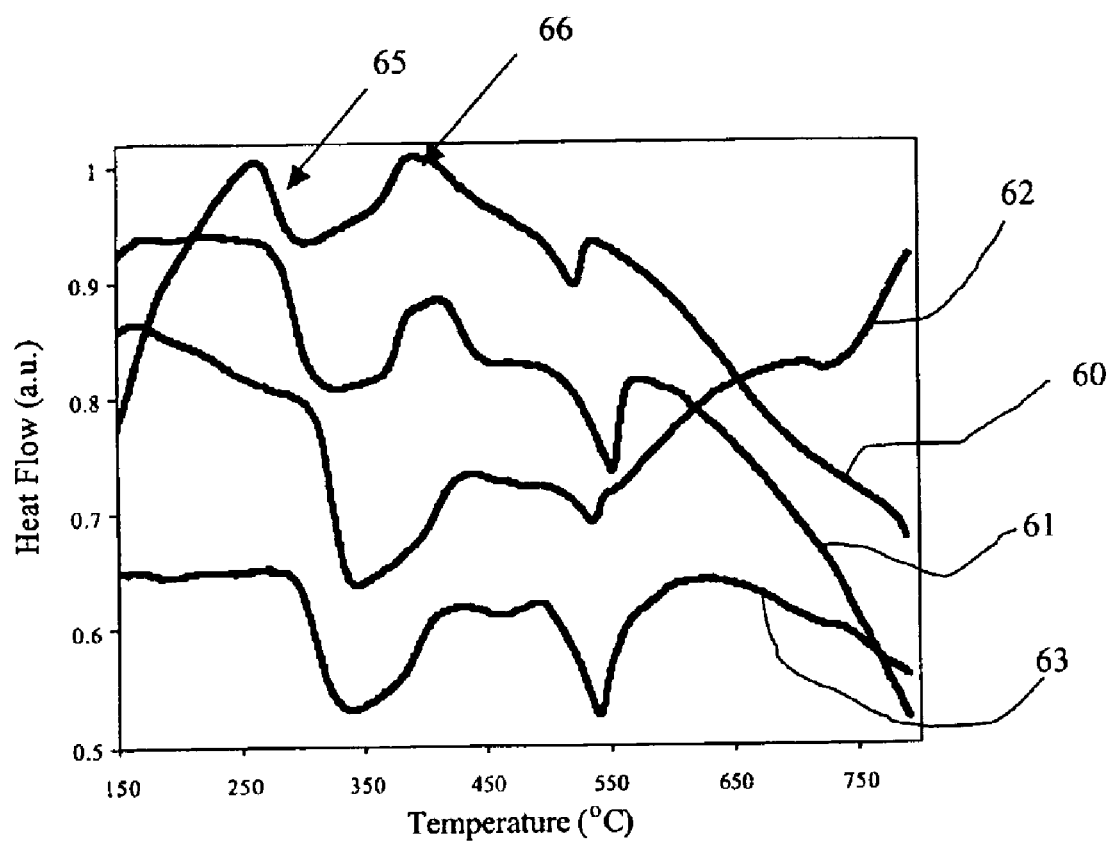
FIGS. 6 and 7 are differential scanning calorimetry (DSC) curves illustrating the thermal stability of the boro-tellurite glass.
Figure 7:
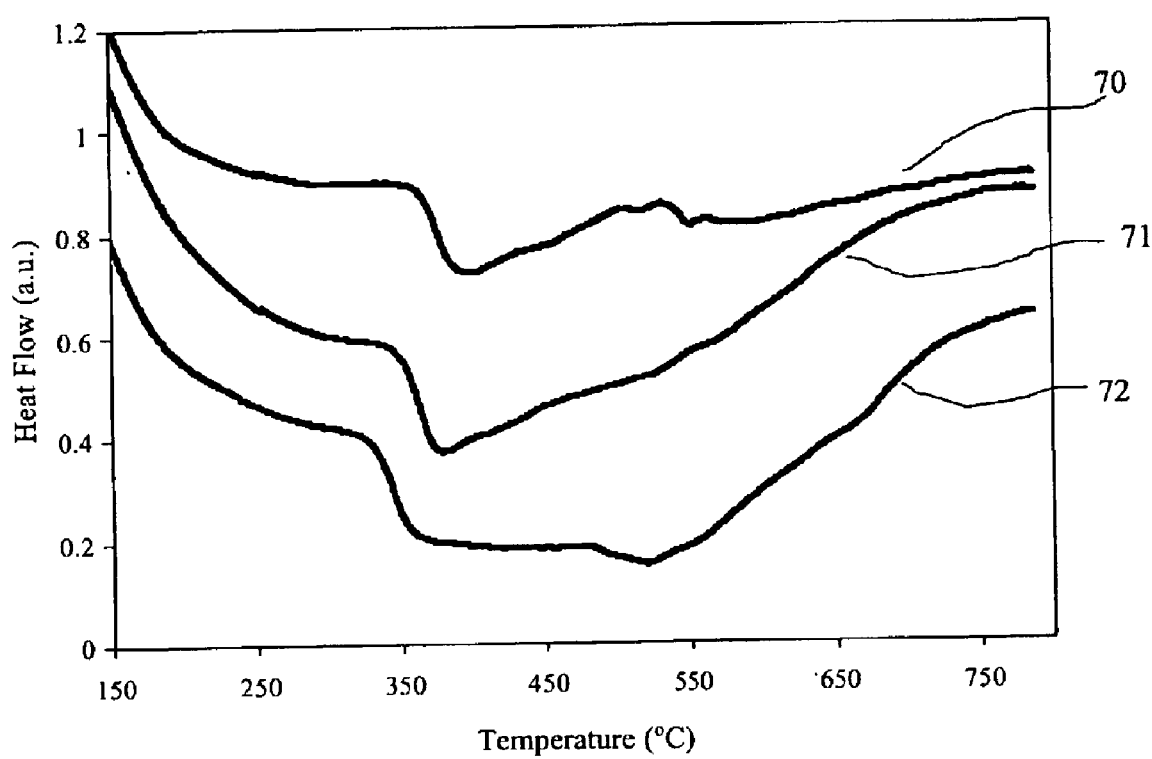

In FIG. 6, the curves 60, 61, 62 and 63 correspond respectively to the glasses 25Na, 5Te, 5Al, and 5Ge listed in Table 1. The first decrease in heat flow 65 corresponds to the glass transition temperature. This decrease is followed by an exothermic peak 66 that is indicative of crystallization. All the curves in FIG. 6 exhibit such crystallization peaks, indicating that the glass compositions 25Na, 5Te, 5Ge, and 5Al do not exhibit very good thermal properties In contrast, the DSC curves 70, 71, and 72 shown in FIG. 7, corresponding respectively to the glasses 10Al5Ge, 10Al and 5Al5Ge listed in Table 1, do not show exothermic peaks and are indicative of excellent thermal properties. The lack of strong exothermic peaks in any of these curves indicates that these glasses do not crystallize when heated. Such properties are highly desirable when the glasses are to be drawn into fibers. The characteristic temperatures for all glasses are reported in Table 2. Except for the glass compositions 25Na, 5Te, 5Ge, and 5Al, all the other glass compositions described in Table 1 lack a crystallization signature upon heating in DSC curves. This illustrates the excellent thermal properties of the glass compositions of the present invention.

TABLE 2

Characteristic temperatures for all glasses.

| Glass | Tg (° C.) | Tx (° C.) | Tc (° C.) | Tm (° C.) | Tg (glass) − Tg (25 Na) |
|---|---|---|---|---|---|
| 25Na | 279 | 365 | s 397 | 522 | 0 |
| 5Te | 292 | 370 | s 412 | 553 | 13 |
| 5Ge | 310 | 380 | vs 432 | 541 | 31 |
| 7Ge | 323 | " | " | s 533 | 44 |
| 5Ge2Te | 314 | " | " | 534 | 35 |
| 5Al | 325 | 398 | vs 437 | 537 | 46 |
| 7Al | 342 | " | " | 549 | 63 |
| 10Al | 362 | " | " | — | 83 |
| 5Al2Te | 334 | " | " | 546 | 55 |
| 5Al5Ge | 344 | " | " | vs 520 | 65 |
| 10Al5Ge | 375 | " | " | s 551 | 96 |
| 15K25W | 352 | " | " | vs 537 | — |

Tg: glass transition temperature;
Tx: onset crystallization temperature;
Tc: crystallization peak temperature;
Tm: melting point temperature if visible under 800° C. (s = smooth; vs = very smooth).

Chemical Durability

Figure 8:
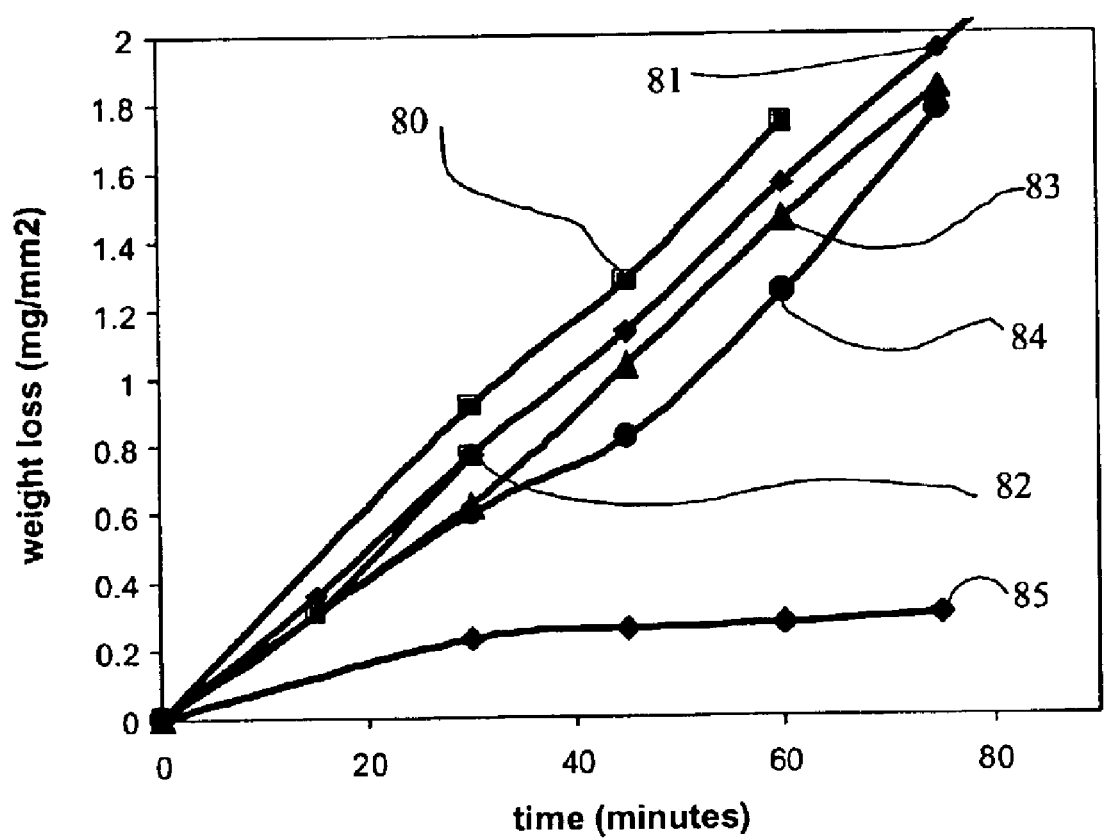
FIGS. 8 through 10 are plots of weight loss per unit of surface illustrating the chemical durability of the boro-tellurite glass.
Figure 9:
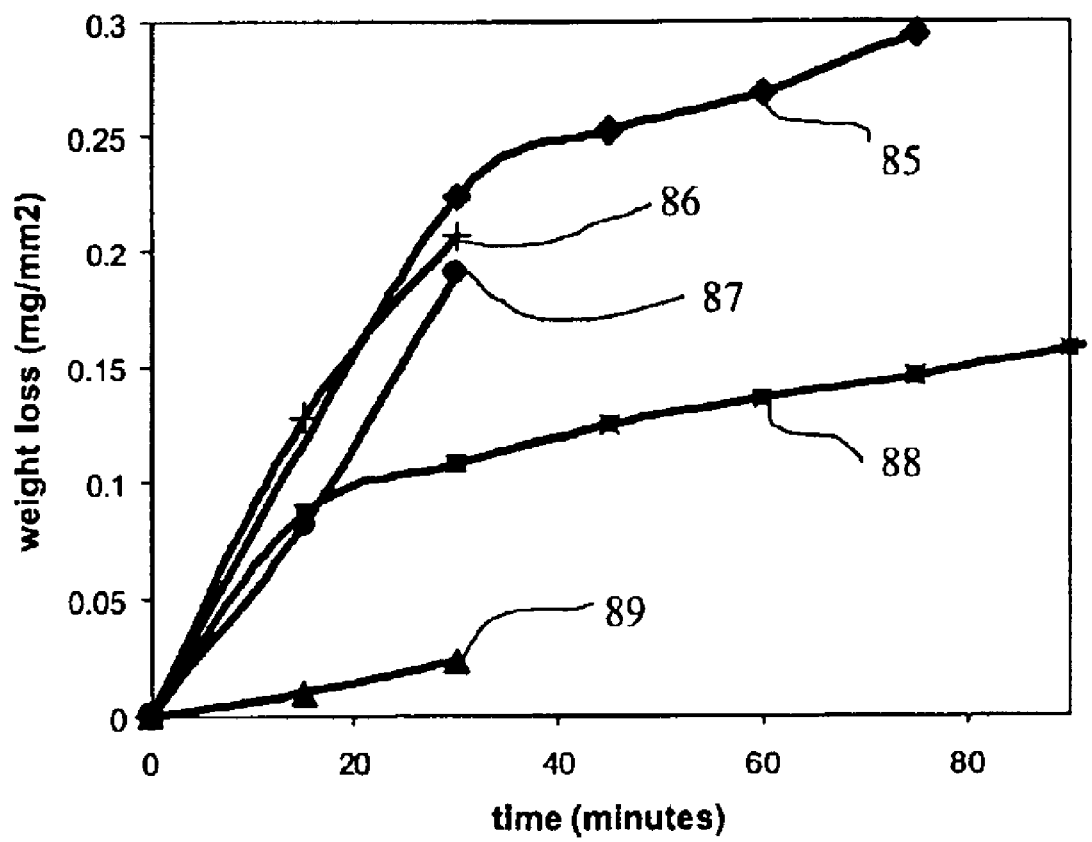
Figure 10:
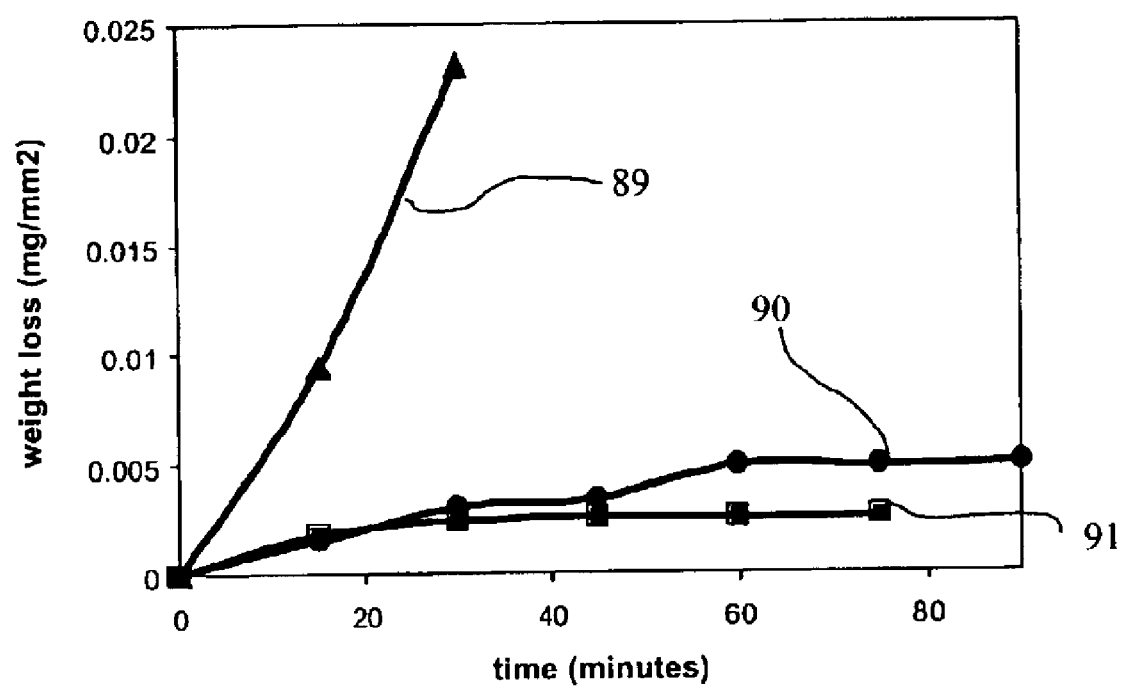

For optical communication applications, EDFAs must resist the natural corrosion exercised by the environment for several decades. The chemical durability of the glasses was tested in boiling water. The faster the glass looses weight in boiling water, the worse is its chemical durability. FIGS. 8, 9 and 10 represent the weight loss per unit of surface as a function of immersion time in boiling water for all the glass compositions listed in Table 1. For clarity, these curves have been split into three figures. The glasses (25Na 80, 7Ge 81, 5Ge2Te 82, 5Te 83, 5Ge 84, and 5Al 85) with the highest weight losses are presented in FIG. 8, those glasses (5Al 85, 5Al2Te 86, 5Al5Ge 87, 7Al 88, and 15K25W 89) with medium weight losses in FIG. 9, and those glasses (15K25W 89, 10Al5Ge 90, and 10Al 91) with the lowest weight losses in FIG. 10. For ease of comparison, the curve obtained for the glass 5Al 85 is repeated in FIG. 9. Likewise that of the glass 15K25W 89 is repeated in FIG. 10.

The glass composition with the highest alkali metal oxide content, 25Na, has the lowest chemical durability. After one hour in boiling water, the glass lost 1.74 mg/mm$^2$. Glasses containing high alkali metal oxide concentrations have the tendency to exhibit a higher decomposition rate in water. Alkali metal ions favor the penetration of water in the glass that leads to a decomposition of the glass network. Therefore a lower concentration of Na$_2$O in the glass results in a better chemical durability. As shown in FIG. 10, when the Al$_2$O$_3$ concentration is 10%, glasses 10Al 91 and 10Al5Ge 90 show good chemical durability. Their respective weight losses after one hour of immersion in boiling water are 0.00255 mg/mm$^2$ and 0.00485 mg/mm$^2$.

Density and Refractive Index

Table 3 summarizes the weight density and the refractive index measured at several wavelengths (633, 830, 1307, and 1550 nm) for all the glass compositions reported in Table 1. The refractive index increases with the density of the glass. The introduction of Al$_2$O$_3$ tends to decrease the density of the glass and consequently its refractive index. When the modifier Na$_2$O is replaced by the intermediate Al$_2$O$_3$ the number of non-bridging oxygen decreases. In oxide glasses, the ionic refractivity of bridging oxygen is smaller than the ionic refractivity of non-bridging oxygen. So the replacement of Na$_2$O by Al$_2$O$_3$ leads to a decrease of the refractive index. Another contribution might be attributed to an increased polarizability of Na$^+$ ions versus Al$^{3+}$ because their ionic radius is larger.

The density of the glass decreases when Na$_2$O is replaced by Al$_2$O$_3$. While the glass modifier Na$_2$O fills the cavities of the preexisting glass structure, the intermediate Al$_2$O$_3$ participates and changes the network of the glass. Hence, Al$_2$O$_3$ expands the volume of the glass network. Since Na$^+$ and Al$^{3+}$ have the same weight, the volume increase associated with the addition of Al$_2$O$_3$ translates into a decrease in density of the glass.

As shown in Table 3, the introduction of Ge or more Te in the glass increases the refractive index. Ge and Te, like other heavy atoms increase the refractive index. This effect is the strongest with Te, which is heavier, larger, and consequently leads to a higher polarizability compared with Ge. GeO$_2$ and TeO$_2$ as network formers modify the structure of the glass and could expand its volume like Al$_2$O$_3$. However, since they are heavy atoms, the density of the glass is increased, when used instead of Na$_2$O.

TABLE 3

Glass density 25° C. (+/− 0.01 g/cm$^3$) and refractive index measured at several wavelengths in various glasses.

| Glass | d (g/cm$^3$) | n at 633 nm | n at 830 nm | n at 1307 nm | n at 1550 nm |
|---|---|---|---|---|---|
| 25 Na | 4.26 | 1.8406 | 1.8222 | 1.8066 | 1.801 |
| 5 Te | 4.45 | 1.8888 | 1.8682 | 1.8509 | 1.8449 |
| 5 Ge | 4.4 | 1.8667 | 1.8477 | 1.8313 | 1.8258 |

TABLE 3-continued

Glass density 25° C. (+/− 0.01 g/cm³) and refractive index measured at several wavelengths in various glasses.

| Glass | d (g/cm³) | n at 633 nm | n at 830 nm | n at 1307 nm | n at 1550 nm |
|---|---|---|---|---|---|
| 7 Ge | 4.46 | 1.8728 | 1.8535 | 1.8372 | 1.8315 |
| 5 Ge 2 Te | 4.47 | 1.893 | 1.8737 | 1.8584 | 1.8506 |
| 5 Al | 4.24 | 1.8433 | 1.8254 | 1.8107 | 1.8047 |
| 7 Al | 4.26 | 1.8384 | 1.8213 | 1.8059 | 1.801 |
| 10 Al | 4.18 | 1.8121 | 1.796 | 1.7822 | 1.7776 |
| 5 Al 2 Te | 4.31 | 1.8594 | 1.8399 | 1.8255 | 1.8202 |
| 5 Al 5 Ge | 4.34 | 1.8508 | 1.8329 | 1.8178 | 1.8127 |
| 10 Al 5 Ge | 4.3 | 1.8386 | 1.8221 | 1.8076 | 1.8023 |
| 15 K 25 W | 5.34 | 1.9949 | 1.9697 | 1.9481 | 1.9432 |

Phonon Energy

Boron oxide is introduced into tellurite oxide glasses to increase the phonon energy of the lattice, while maintaining good chemical durability of the glass. Transmission spectra in the infrared were measured using infra-red spectroscopy to verify this effect. The glasses tested can be classified in four groups: 1) alkali-boro-tellurite glasses; 2) alkali-boro-tellurite glasses containing $Al_2O_3$ or $GeO_2$; 3) tellurite glasses containing some tungsten oxide; and 4) pure alkali-tellurite glasses. Table 4 summarizes the glasses tested and the measured phonon energies.

Figure 12:
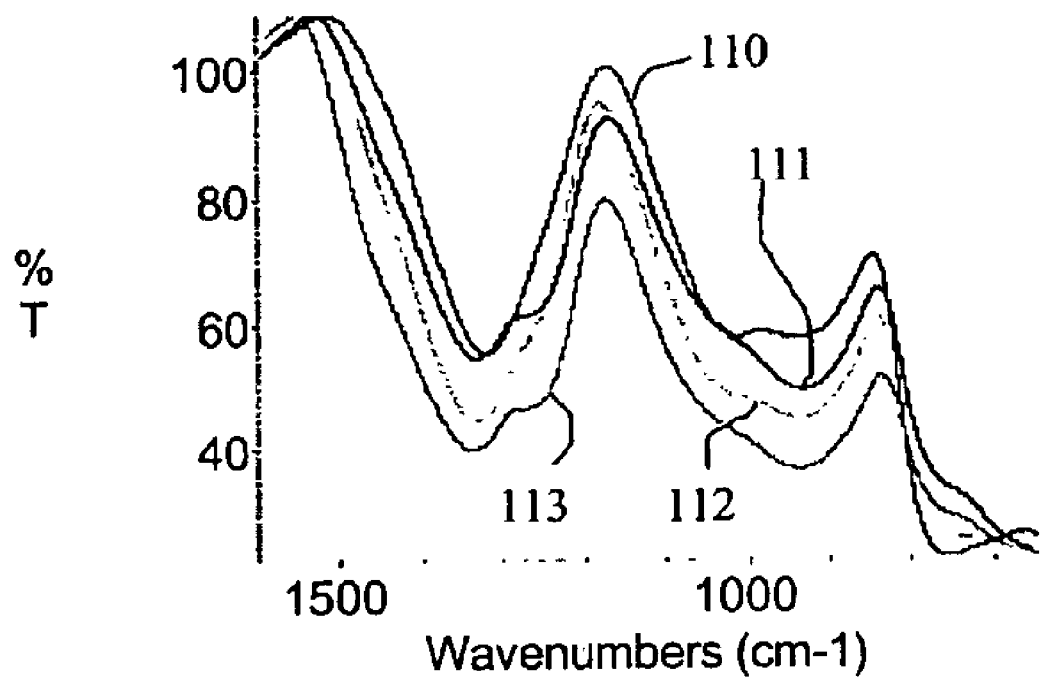

FIG. 12 shows the transmission spectra of alkali-boro-tellurite glasses 30 $Na_2O$–10 $B_2O_3$–60 $TeO_2$–$1_{WT}$ $Er_2O_3$ 110, 20 $Na_2O$–15 $B_2O_3$–65 $TeO_2$–$1_{WT}$ $Er_2O_3$ 111, 25 $Na_2O$–15 $B_2O_3$–60 $TeO_2$–$1_{WT}$ $Er_2O_3$ 112, and 20 $Na_2O$–20 $B_2O_3$–60 $TeO_2$–$1_{WT}$ $Er_2O_3$ 113. As expected, the introduction of $B_2O_3$ into tellurite glasses increases the phonon energy significantly up to 1337 cm$^{-1}$ as also reported in Table 4. This phonon energy can be attributed to the asymmetric stretching of the bonds =B—O≡ or O—B—O. Note that the shapes of the spectra shown in FIG. 12 are nearly identical for all four glasses. A small difference is in the lack of a shoulder near 1260 cm$^{-1}$ in glass 110 containing 10% of $B_2O_3$. Since this band is due to the B—O—B stretching, we suspect that 10% of $B_2O_3$ is not enough to have a significant proportion of two boron atoms connected to the same oxygen, if the glass is homogeneous.

FIG. 12 also shows that the addition of boron oxide to the tellurite glasses leads to the appearance of another broad absorption band around 937 cm$^{-1}$ with a shoulder at around 1033 cm$^{-1}$. These two bands can be attributed to the asymmetric stretching of =B—O—B≡ or =B—O— bonds. As expected the absorption bands due to $TeO_2$ at around 764 and 692 cm$^{-1}$ are still observable.

Figure 13:
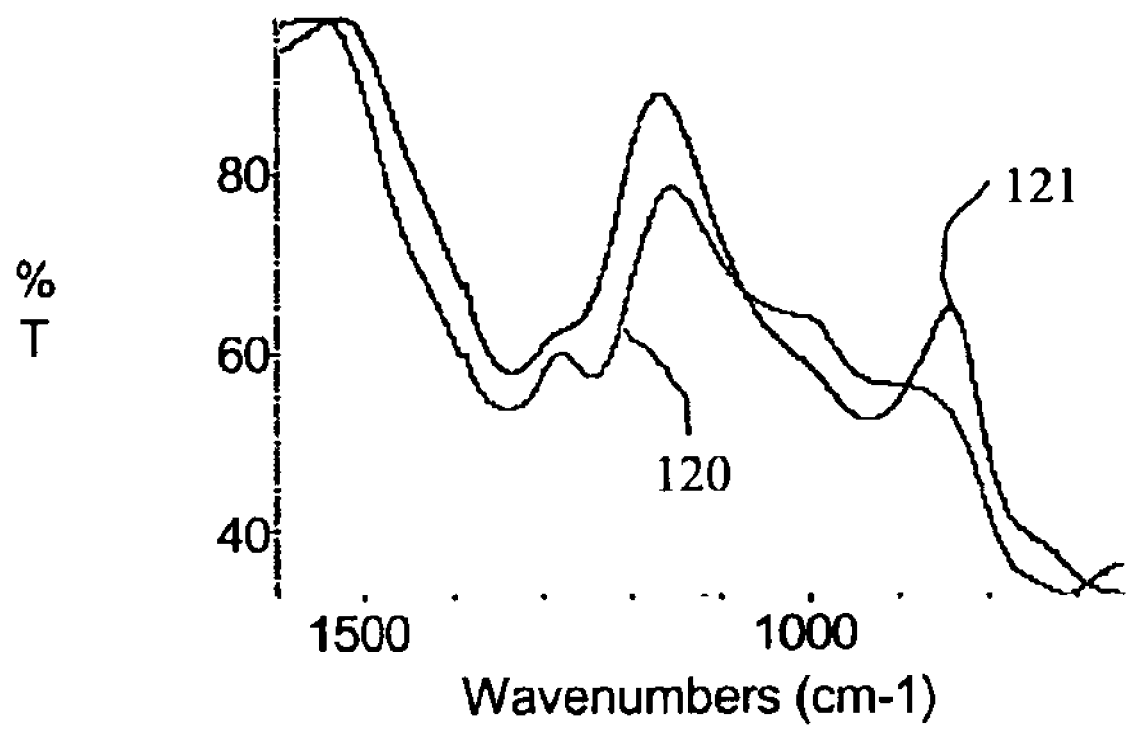

The transmission spectra of glasses with compositions 20 $Na_2O$–5 $Al_2O_3$–15 $B_2O_3$–60 $TeO_2$–1 wt. % $Er_2O_3$ 120 and 20 $Na_2O$–$GeO_2$–15 $B_2O_3$–60 $TeO_2$–1 wt. % $Er_2O_3$ 121 shown in FIG. 13 are very similar to those in FIG. 12. The addition of 5% of germanium oxide doesn't seem to influ-

TABLE 4

| Composition of the glass (% mol) - $1_{WT}$ $Er_2O_3$ | Absorption wave number (cm$^{-1}$) from the transmission spectra V: curve in V shape, W: curve in W shape, Sh: shoulder, FSh: flat shoulder | | | | | |
|---|---|---|---|---|---|---|
| 30 $Na_2O$–10 $B_2O_3$–60 $TeO_2$ | 1321.9 (V) | | 1014.4 (W) | 941.1 (W) | | 759.0 (V) | 697.0 (Sh) |
| 25 $Na_2O$–15 $B_2O_3$–60 $TeO_2$ | 1332.8 (V) | 1258.7 (Sh) | 1029.2 (Sh) | 935.7 (V) | | 763.2 (FSh) | 682.6 (V) |
| 20 $Na_2O$–20 $B_2O_3$–60 $TeO_2$ | 1337.5 (V) | 1263.1 (FSh) | 1046.6 (Sh) | 938.9 (V) | | 766.8 (Sh) | 695.7 (Sh) |
| 20 $Na_2O$–15 $B_2O_3$–65 $TeO_2$ | 1331.9 (V) | 1258.7 (Sh) | 1035.5 (Sh) | 933.3 (V) | | 764.5 (Sh) | 689.0 (Sh) |
| 20 $Na_2O$–5 $Al_2O_3$–15 $B_2O_3$–60 $TeO_2$ | 1340.0 (W) | 1245.2 (W) | 1020.0 (FSh) | 910.0 (FSh) | | 761.4 (Sh) | 715.7 (V) |
| 20 $Na_2O$–5 $GeO_2$–15 $B_2O_3$–60 $TeO_2$ | 1334.2 (V) | 1255.3 (Sh) | 1035.5 (Sh) | 934.4 (V) | | 764.5 (Sh) | 685.7 (Sh) |
| 20 $K_2O$–10 $WO_3$–10 $B_2O_3$–60 $TeO_2$ | 1335.1 (W) | 1248.8 (W) | 1059.1 (Sh) | *916.8 (V) | 848.7 (FSh) | 785.9 (Sh) | 690.8 (Sh) |
| 15 $K_2O$–25 $WO_3$–60 $TeO_2$ | | | | *928.6 (V) | 845.5 (FSh) | 773.0 (Sh) | 682.1 (Sh) |
| 35 $Na_2O$–65 $TeO_2$ | | | | | | 756.4 (V) | |
| 30 $Na_2O$–70 $TeO_2$ | | | | | | 757.9 (Sh) | 688.5 (Sh) |
| Component the most responsible Vibration bond attribution s = stretching, s-s = symmetry stretching, as-s = asymmetry stretching, b = bending, g = group Other responsible component | $B_2O_3$ =B—O≡ or O—B—O (as-s) | $B_2O_3$ B—O—B (s) | $B_2O_3$ =B—O—B≡ or =B—O— (as-s) | $B_2O_3$ =B—O—B≡ =B—O— (as-s) *$WO_3$ | $WO_3$ [$WO_4$] (g) | $TeO_2$ O—Te—O or Te—O$^-$ (as) $B_2O_3$ could influence =B—O—B= (b) | $TeO_2$ O—Te—O or Te—O$^-$ (as) |

Figure 11:
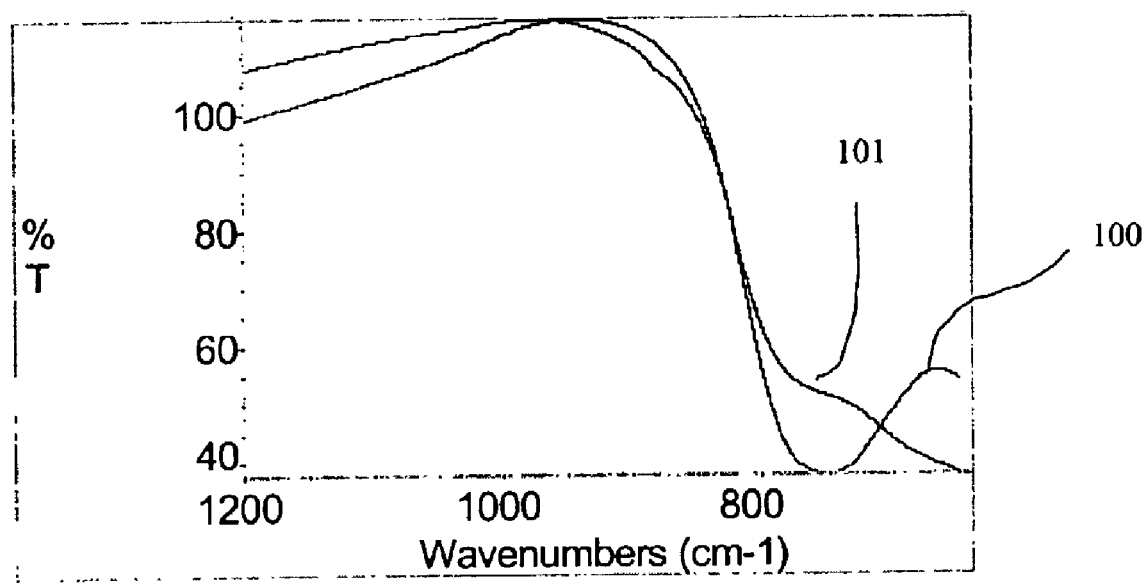
FIGS. 11 through 14 are transmission spectra illustrating the increased phonon energy of the boro-tellurite glass.

FIG. 11 shows the transmission spectra of two alkali-tellurite glasses 35 $Na_2O$–65 $TeO_2$–$1_{WT}$ $Er_2O_3$ 100 and 30 $Na_2O$–70 $TeO_2$–$Er_2O_3$ 101. This figure clearly illustrates that the highest phonon energy of $TeO_2$ is around 757 cm$^{-1}$. The alkaline oxide, as a modifier, has no influence on the phonon energy of the lattice of the glass. This absorption around 757 cm$^{-1}$ can be attributed to the asymmetric vibration of the O—Te—O or O—Te—O$^-$ bonds.

ence the spectrum in one-way or another. In contrast, when $Al_2O_3$ is added to alkali-boro-tellurite glasses the transmission spectrum changes as shown in FIG. 13.

Figure 14:
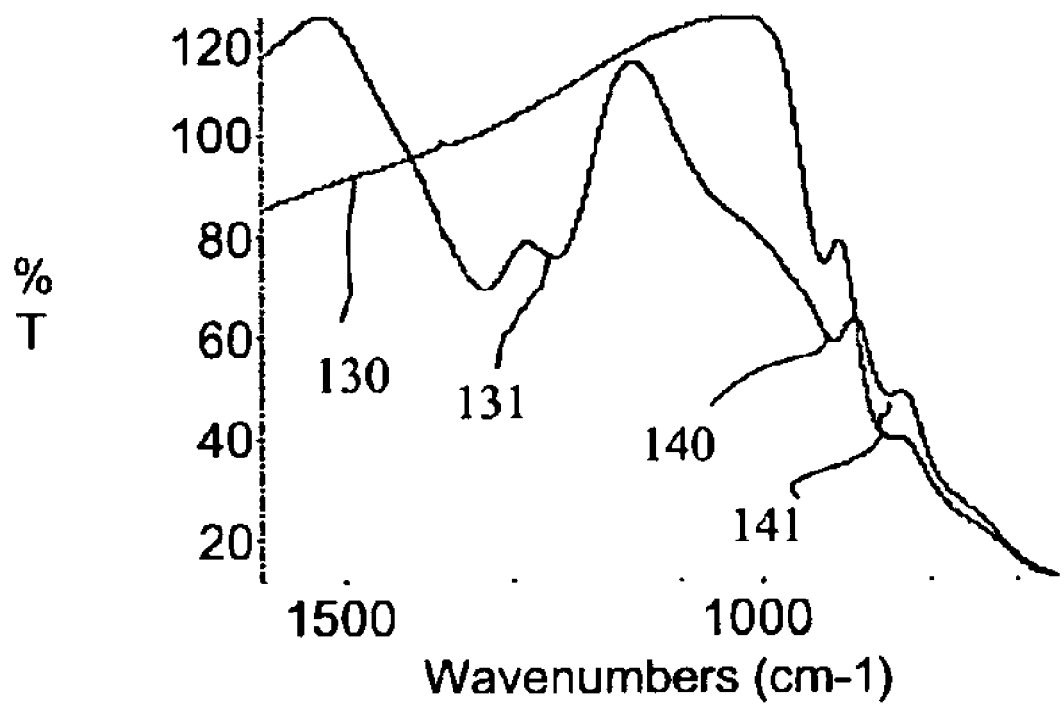

In alkali-tellurite glasses containing tungsten oxide such as in glasses with compositions 15 $K_2O$–25 $WO_3$–60 $TeO_2$–$1_{WT}$ $Er_2O_3$ 130 and 20 $K_2O$–10 $WO_3$–10 $B_2O_3$–60 $TeO_2$–$1_{WT}$ $Er_2O_3$ 131, two additional absorption bands are observed respectively at 929 and 846 cm$^{-1}$ as illustrated in FIG. 14. The two bands 140 and 141 are attributed to the tungsten oxide and more particularly to the vibrations of the $WO_4$ tetrahedrons. When $B_2O_3$ is added to a tungstate alkali-tellurite glass, the absorption band at 1249 cm$^{-1}$ typical of the B—O—B stretching mode is well defined. This indicates that the proportion of two boron atoms connected to the same oxygen is important and that consequently $WO_3$ and $B_2O_3$ can not be mixed well in this particular glass composition.

As a proof, when the glass was cast at low cooling rate, the glass had poor optical transparency, indicative of phase separation and poor homogeneity.

Spectral properties

The optical properties (absorption and emission) of the erbium ions that were doped into the different glasses are summarized in Table 5. The second column of the table indicates the concentration of erbium ions. This concentration varies with the glass composition because the constant amount of erbium oxide that was incorporated into the different glasses was measured in wt %. The third column ($\int \sigma_a(\lambda)d\lambda$ in cm$^2$) describes the total absorption cross section of the 1550 nm band. The fourth column gives the absorption bandwidth ($\Delta\lambda_a$ in nm). The fifth and sixth columns describe the total emission cross section of the 1550 nm band ($\int \sigma_e(\lambda)d\lambda$ in cm$^2$), and the emission bandwidth ($\Delta\lambda_e$ in nm), respectively. The last column lists the measured lifetime ($\tau_{meas.}$ in ms) of the $^4I_{13/2}$ excited state.

gain of 13.5 dB is achieved at 1533 nm and a gain of 2 dB is measured at longer wavelength near 1600 nm. These results show that these new glasses can provide gain over a broad spectrum, especially at longer wavelengths While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A boro-tellurite glass composition comprising the following ingredients:
   $TeO_2$ from 50 to 70 mole percent,
   $B_2O_3$ from 5 to 22 mole percent,
   $R_2O$ from 5 to 25 mole percent,
   MO from 0 to 15 mole percent,
   $A_2O_3$ from 5 to 18 mole percent,
   $GeO_2$ from 0 to 7 mole percent, and
   $L_2O_3$ from 0.25 to 10 weight percent,
   wherein $R_2O$ is selected from the oxides $Li_2O$, $K_2O$, $Na_2O$ and mixtures thereof, MO is selected from the oxides BaO, MgO, CaO, ZnO and mixtures thereof, $A_2O_3$ is selected from $Al_2O_3$, $Y_2O_3$ and mixtures thereof, and $L_2O_3$ is

TABLE 5

Optical properties of $Er^{3+}$ ions contained in various glasses.

| Glass | $Er^{3+}$ ($10^{20}$ ions/cm$^3$) | $\int \sigma_a(\lambda)d\lambda$ ($10^{-19}$ cm$^2$) | $\Delta\lambda_a$ (nm) | $\int \sigma_e(\lambda)d\lambda$ ($10^{-19}$ cm$^2$) | $\Delta\lambda_e$ (nm) | $\Delta\lambda_{e\ meas.}$ (nm) | $\tau_{meas.}$ (+/- 0.1 ms) at 1535 nm |
|---|---|---|---|---|---|---|---|
| 25 Na | 1.328 | 4.47 | 57.28 | 4.53 | 54.47 | 54.30 | 3.17 |
| 5 Te | 1.387 | 4.84 | 59.33 | 5.08 | 57.86 | 56.01 | 2.98 |
| 5 Ge | 1.372 | 5.07 | 59.03 | 5.28 | 57.40 | 55.80 | 2.97 |
| 7 Ge | 1.389 | 4.83 | 60.45 | 5.16 | 59.91 | 57.48 | 3.26 |
| 5 Ge 2 Te | 1.392 | 4.68 | 60.06 | 4.62 | 58.66 | 55.22 | 3.41 |
| 5 Al | 1.32 | 4.74 | 59.32 | 4.91 | 57.48 | 56.21 | 2.93 |
| 7 Al | 1.327 | 4.39 | 60.52 | 4.59 | 58.88 | 55.97 | 2.81 |
| 10 Al | 1.301 | 4.68 | 62.84 | 4.94 | 61.90 | 61.37 | 3.07 |
| 5 Al 2 Te | 1.342 | 4.78 | 60.49 | 4.93 | 59.02 | 59.25 | 2.96 |
| 5 Al 5 Ge | 1.352 | 4.87 | 61.68 | 5.13 | 60.04 | 57.06 | 3.20 |
| 10 Al 5 Ge | 1.339 | 4.93 | 66.81 | 5.32 | 66.23 | 61.99 | 2.05 |
| 15 K 25 W | 1.665 | 5.12 | 61.29 | 5.41 | 60.12 | 55.75 | 3.66 |

Gain Properties

To evaluate the optical gain properties of $Er^{3+}$ doped boro-tellurite glasses for use in optical amplifiers and lasers, optical fibers were fabricated from these glasses and tested. The preform for the fiber was fabricated from the following glasses: for the core a glass with composition $60TeO_2 + 15B_2O_3 + 10Al_2O_3 + 15Na_2O + 0.5$ wt. % $Er_2O_3$ was used, and for the cladding a glass with composition $57.75TeO_2 + 15B_2O_3 + 10Al_2O_3 + 15Na_2O$ ZnO. At the wavelength of 1550 nm, the refractive index of the core and cladding were n=1.7834 and n=1.7738, respectively. The fiber was drawn from the preform using standard fiber pulling techniques.

Figure 15:
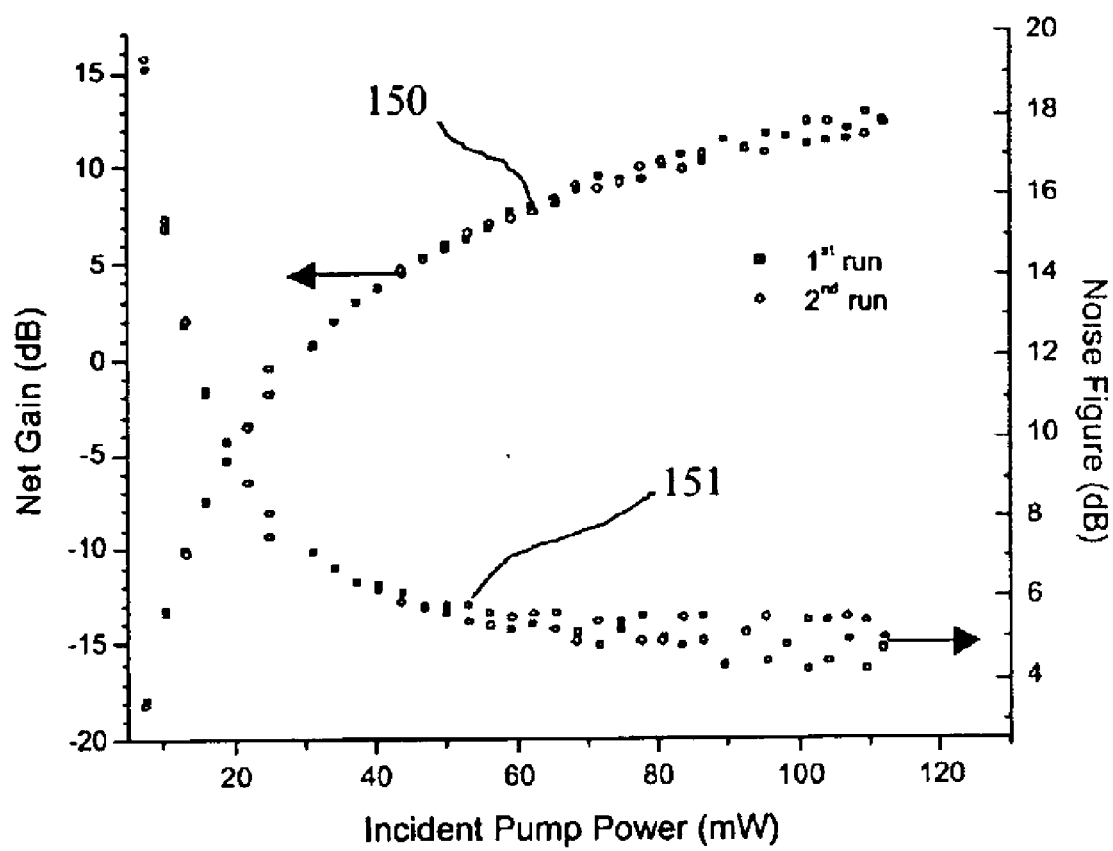
FIGS. 15 and 16 are gain curves and gain spectra illustrating the enhanced gain of a boro-tellurite glass fiber.

FIG. 15 shows the gain 150 and noise FIG. 151 measured in a 15 cm-long tellurite fiber for an input signal at 1535 nm and as a function of the power of the pump with wavelength 976 nm. A gain of 12 dB was achieved at a pumping power of 110mw and the corresponding noise figure was around 5 dB. The gain curve indicates that the saturation is not reached. The gain can be further raised by increasing the pumping power or by increasing the fiber length.

Figure 16:
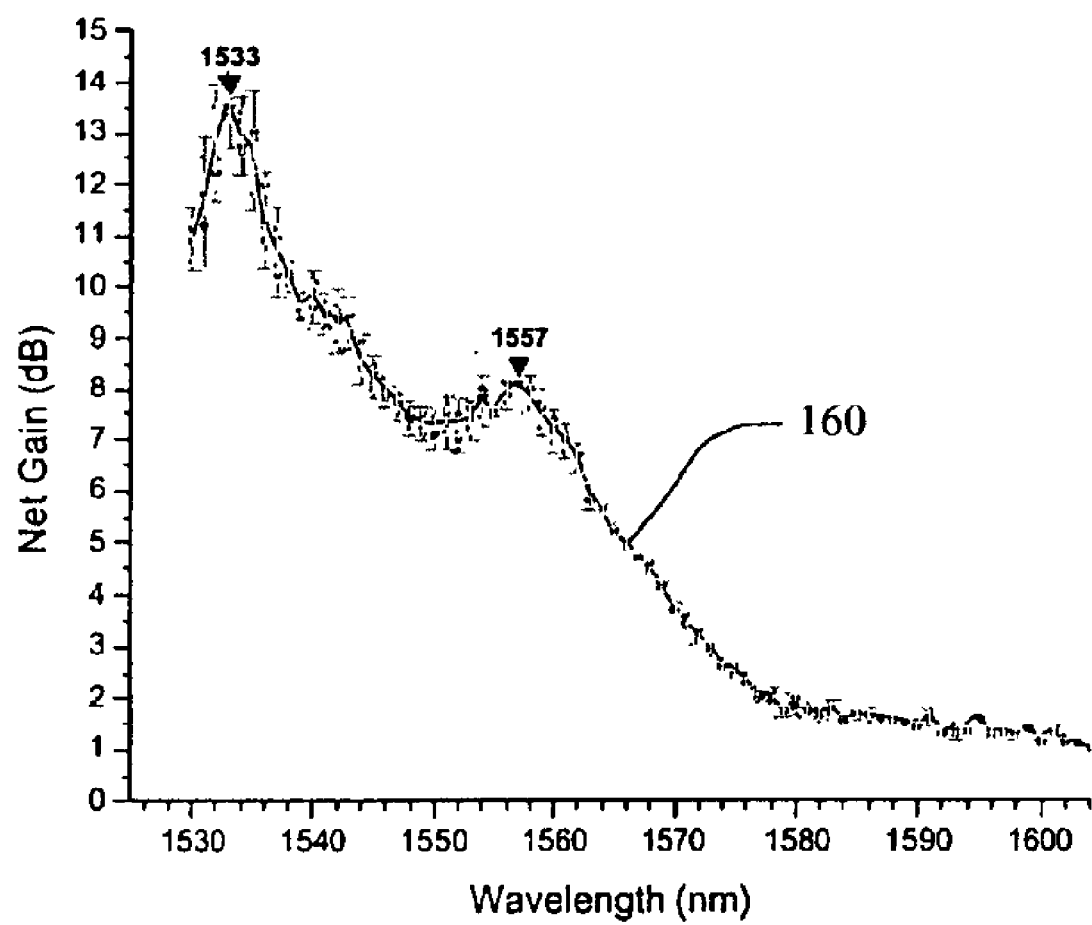

FIG. 16 is the gain spectrum 160 measured in the same tellurite fiber at a pumping power of 112 mW. A maximum selected from rare earth oxides $Er_2O_3$, $Yb_2O_3$, $Tm_2O_3$, $Tb_2O_3$, $CeO_2$, $Sm_2O_3$ and $Nd_2O_3$ and mixtures thereof.

2. The boro-tellurite glass composition of claim 1, wherein the composition comprises $TeO_2$ from 55 to 65 mole percent, $B_2O_3$ from 10 to 20 mole percent, $A_2O_3$ from 7 to 15 mole percent, a glass network modifier $R_2O$ from 10 to 20 mole percent, a glass network modifier MO from 0 to 10 mole percent, $GeO_2$ from 0 to 5 mole percent and rare-earth dopant $L_2O_3$ from 0.25 to 6 weight percent.

3. The boro-tellurite glass of claim 2, wherein $A_2O_3$ is 7 to 15 mole percent $Al_2O_3$.

4. The boro-tellurite glass of claim 2, wherein $A_2O_3$ is 10 to 15 mole percent $Al_2O_3$.

5. The boro-tellurite glass composition of claim 2, wherein the composition comprises approximately 60 mole percent $TeO_2$, approximately 15 mole percent $B_2O_3$, approximately 10 mole percent $Al_2O_3$, and approximately 15 mole percent $Na_2O$.

6. The boro-tellurite glass composition of claim 2, wherein the rare-earth dopant $L_2O_3$ comprises approximately 0.25 to 3 weight percent of $Er_2O_3$.

7. The boro-tellurite glass composition of claim 2, wherein the rare-earth dopant $L_2O_3$ comprises a mixture of approximately 0.25 to 5 weight percent of $Er_2O_3$ and $Yb_2O_3$.

8. The boro-tellurite glass composition of claim 7, wherein the mixture comprises 0.25 –3 weight percent $Er_2O_3$ and 0.25 –3 weight percent $Yb_2O_3$.

9. The boro-tellurite glass composition of claim 2, wherein the rare-earth dopant $L_2O_3$ comprises approximately 0.25 to 3 weight percent of $Tm_2O_3$.

10. A boro-tellurite glass composition comprising the following ingredients:
$TeO_2$ from 55 to 65 mole percent,
$B_2O_3$ from 10 to 20 mole percent,
$Na_2O$ from 10 to 20 mole percent,
MO from 0 to 10 mole percent,
$Al_2O_3$ from 7 to 15 mole percent,
$GeO_2$ from 0 to 7 mole percent, and
$L_2O_3$ from 0.25 to 6 weight percent,
wherein MO is selected from the oxides BaO, MgO, CaO, ZnO and mixtures thereof, and $L_2O_3$ is selected from rare earth oxides $Er_2O_3$, $Yb_2O_3$, $Tm_2O_3$, $Tb_2O_3$, $CeO_2$, $Sm_2O_3$ and $Nd_2O_3$ and mixtures thereof.

11. The boro-tellurite glass of claim 10, comprising 10 to 15 mole percent $Al_2O_3$.

12. The boro-tellurite glass composition of claim 10, wherein the rare-earth dopant $L_2O_3$ comprises approximately 0.25 to 3 weight percent of $Er_2O_3$.

13. The boro-tellurite glass composition of claim 10, wherein the rare-earth dopant $L_2O_3$ comprises a mixture of approximately 0.25 to 5 weight percent of $Er_2O_3$ and $Yb_2O_3$.

14. The boro-tellurite glass composition of claim 10, wherein the mixture comprises 0.25 –3 weight percent $Er_2O_3$ and 0.25 –3 weight percent $Yb_2O_3$.

15. An optical fiber, comprising a core and a cladding formed of a glass having the following ingredients:
$TeO_2$ from 50 to 70 mole percent,
$B_2O_3$ from 5 to 22 mole percent,
$R_2O$ from 5 to 25 mole percent,
MO from 0 to 20 mole percent,
$A_2O_3$ from 5 to 18 mole percent,
$GeO_2$ from 0 to 7 mole percent, wherein $R_2O$ is selected from the oxides $Li_2O$, $K_2O$, $Na_2O$ and mixtures thereof, MO is selected from the oxides BaO, MgO, CaO, ZnO and mixtures thereof, $A_2O_3$ is selected from $Al_2O_3$, $Y_2O_3$ and mixtures thereof, and said core further comprising,
Rare-earth dopant $L_2O_3$ from 0.25 to 10 weight percent, wherein $L_2O_3$ is selected from rare earth oxides $Er_2O_3$, $Yb_2O_3$, $Tm_2O_3$, $Tb_2O_3$, $CeO_2$, $Sm_2O_3$ and $Nd_2O_3$ and mixtures thereof.

16. The optical fiber of claim 15, wherein the composition comprises $TeO_2$ from 55 to 65 mole percent, $B_2O_3$ from 10 to 20 mole percent, $A_2O_3$ from 7 to 15 mole percent, a glass network modifier $R_2O$ from 10 to 20 mole percent, a glass network modifier MO from 0 to 10 mole percent, $GeO_2$ from 0 to 5 mole percent and rare-earth dopant $L_2O_3$ from 0.25 to 6 weight percent.

17. The optical fiber of claim 16, wherein $A_2O_3$ is 10 to 15 mole percent $Al_2O_3$.

18. The optical fiber of claim 16, wherein the rare-earth dopant $L_2O_3$ comprises approximately 0.25 to 3 weight percent of $Er_2O_3$.

19. The optical fiber of claim 16, wherein the rare-earth dopant $L_2O_3$ comprises a mixture of approximately 0.25 to 5 weight percent of $Er_2O_3$ and $Yb_2O_3$.

20. An erbium doped fiber amplifier (EDFA), comprising:
A fiber having a core and a cladding formed from a glass having the following ingredients: $TeO_2$ from 50 to 70 mole percent, $B_2O_3$ from 8 to 22 mole percent, $R_{2O}$ from 5 to 20 mole percent; MO from 0 to 20 mole percent, $A_2O_3$ from 7 to 18 mole percent, $GeO_2$ from 0 to 7 mole percent, wherein $R_2O$ is selected from the oxides $Li_2O$, $K_2O$, $Na_2O$ and mixtures thereof, MO is selected from the oxides BaO, MgO, CaO, ZnO and mixtures thereof, $A_2O_3$ is selected from $Al_2O_3$, $Y_2O_3$ and mixtures thereof, said core further comprising rare-earth dopant $L_2O_3$ from 0.25 to 10 weight percent, wherein $L_2O_3$ is selected from rare earth oxides $Er_2O_3$, $Yb_2O_3$, $Tm_2O_3$, $Tb_2O_3$, $CeO_2$, $Sm_2O_3$ and $Nd_2O_3$ mixtures thereof; and
A 980 nm optical pump configured to pump the ionic energy levels of the rare-earth dopant in said fiber to produce stimulated emission and amplification of an input signal propagating through said fiber.

21. The EDFA of claim 20, wherein the composition comprises $TeO_2$ from 55 to 65 mole percent, $B_2O_3$ from 10 to 20 mole percent, $A_2O_3$ from 7 to 15 mole percent, a glass network modifier $R_2O$ from 10 to 20 mole percent, a glass network modifier MO from 0 to 10 mole percent, $GeO_2$ from 0 to 5 mole percent and rare-earth dopant $L_2O_3$ from 0.25 to 6 weight percent.

22. The EDFA of claim 21, wherein $A_2O_3$ is 10 to 15 mole percent $Al_2O_3$.

23. The EDFA of claim 21, wherein the rare-earth dopant $L_2O_3$ comprises approximately 0.25 to 3 weight percent of $Er_2O_3$.

24. The EDFA of claim 21, wherein the rare-earth dopant$L_2O_3$ comprises a mixture of approximately 0.25 to 5 weight percent of $Er_2O_3$ and $Yb_2O_3$.

25. The EDFA of claim 21, wherein optical pump comprises a multi-mode pump and a pump coupler.

26. The EDFA of claim 25, wherein the pump coupler comprises a TIR coupler.

27. A boro-tellurite glass composition comprising the following ingredients:
$TeO_2$ from 50 to 70 mole percent,
$B_2O_3$ from 5 to 22 mole percent,
$R_2O$ from 5 to 25 mole percent,
MO from 0 to 15 mole percent,
$A_2O_3$ from 0 to 18 mole percent,
$GeO_2$ from 0 to 7 mole percent, and
$L_2O_3$ from 0.25 to 10 weight percent,
wherein $R_2O$ is selected from the oxides $Li_2O$, $K_2O$, $Na_2O$ and mixtures thereof, MO is selected from the oxides BaO, MgO, CaO, ZnO and mixtures thereof, $A_2O_3$ is selected from $Al_2O_3$, $Y_2O_3$ and mixtures thereof, and $L_2O_3$ is selected from rare earth oxides $Er_2O_3$, $Yb_2O_3$, $Tm_2O_3$, $Tb_2O_3$, $CeO_2$, $Sm_2O_3$ and $Nd_2O_3$ and mixtures thereof.

28. The boro-tellurite glass of claim 27, wherein $A_2O_3$ is 5 to 15 mole percent $Al_2O_3$.

29. The boro-tellurite glass of claim 27, wherein $A_2O_3$ is 10 to 15 mole percent $Al_2O_3$.

* * * * *